July 24, 1923.

A. D. MacLELLAN

PERCENTAGE FEEDER AND MIXER

Filed April 5, 1922

Inventor
Angus D. MacLellan
By his Attorneys
Merchant & Kilgore

Patented July 24, 1923.

1,462,649

UNITED STATES PATENT OFFICE.

ANGUS D. MacLELLAN, OF OWENSBORO, KENTUCKY, ASSIGNOR TO MacLELLAN MIXER COMPANY, OF OWENSBORO, KENTUCKY, A CORPORATION OF KENTUCKY.

PERCENTAGE FEEDER AND MIXER.

Application filed April 5, 1922. Serial No. 549,933.

*To all whom it may concern:*

Be it known that I, ANGUS D. MacLEL-LAN, a citizen of the United States, residing at Owensboro, in the county of Daviess and State of Kentucky, have invented certain new and useful Improvements in Percentage Feeders and Mixers; and I do hereby declare the following to be a full, clear, and exact description of the invention, such as will enable others skilled in the art to which it appertains to make and use the same.

My present invention provides an extremely simple, compact and highly efficient self-contained percentage feeder adapted, for example, to feed and commingle in predetermined desired proportions different kinds of flour for producing blended flour, or different kinds of granular, grounded or other materials for producing stock foods. Such percentage feeders are, of course, adapted for more general use.

In the accompanying drawings, which illustrate the preferred form of the percentage feeder, like characters indicate like parts throughout the several views.

Referring to the drawings.

Figure 1:
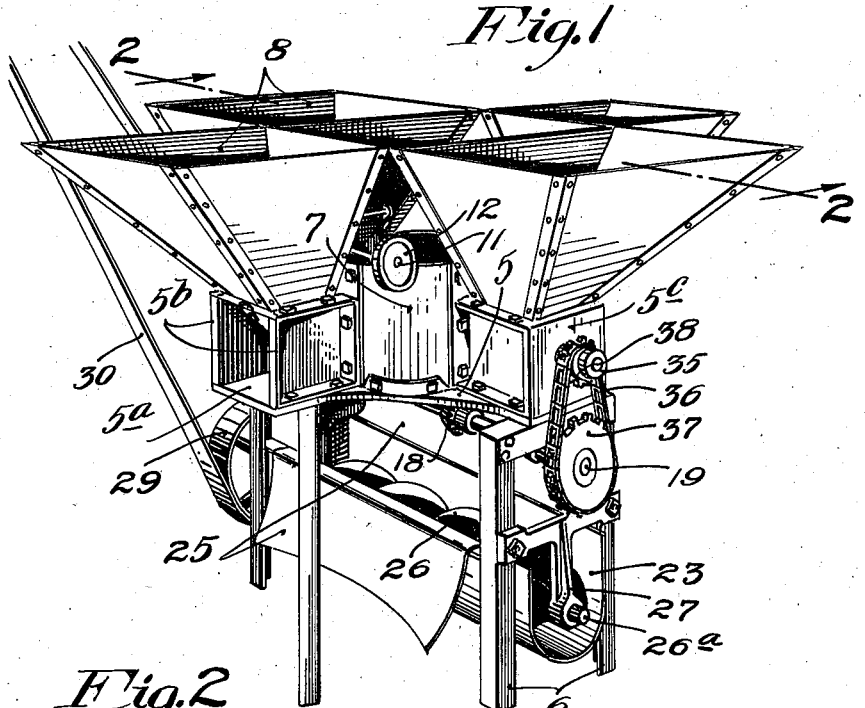
Fig. 1 is a perspective view showing the improved feeder.
Figure 2:
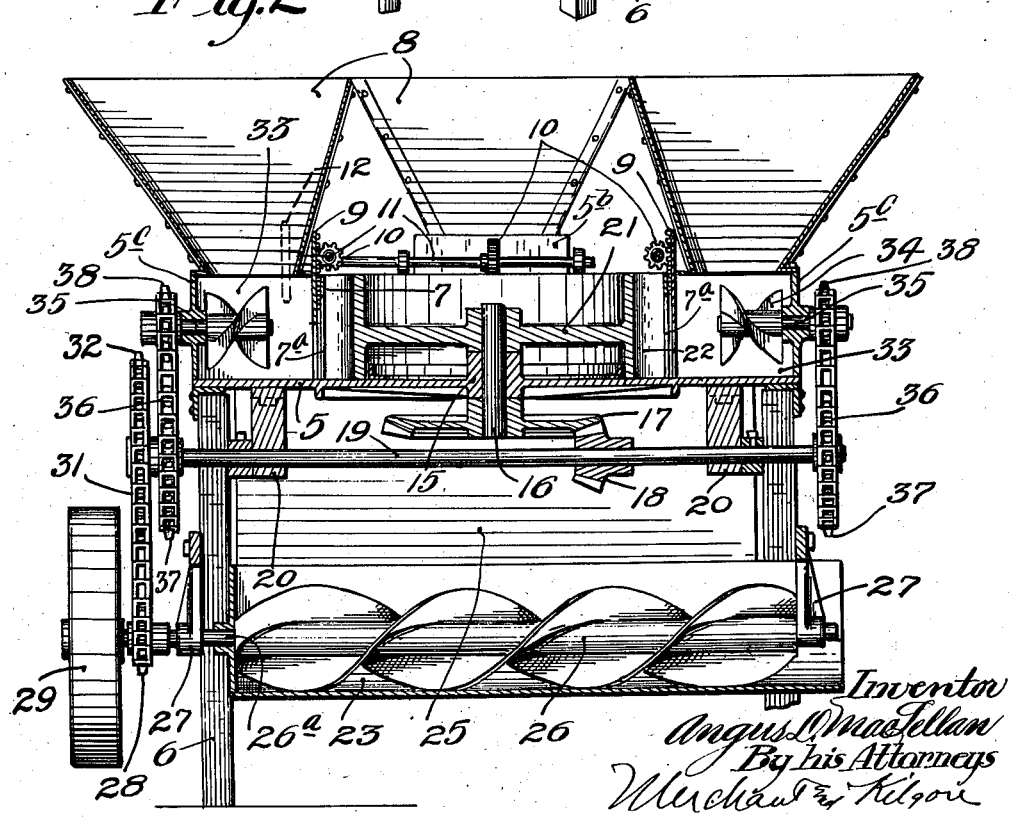
Fig. 2 is a vertical section taken on the line 2—2 of Fig. 1.

The numeral 5 indicates a face plate or table top supported by a suitable leg structure 6 and provided with an upstanding cylindrical rim 7, which, as shown, is cut away or formed with large openings 7ª at four points on the quadrants of a circle. Below the openings 7ª, the face place 5 is provided with flat outward extensions 5ª that have upstanding laterally spaced flanges 5ᵇ. Supply hoppers 8 are secured to the flanges 5ᵇ and are provided with discharge openings aligned with the passages 7ª and adapted to be opened and closed to any desired extent by vertically movable discharge gates 9. These discharge gates 9, as shown, are provided with rack teeth engaged by pinions 10 on gate-actuating shafts 11 journaled in the inner ends of the flanges 5ᵇ and provided with hand wheels 12. Also, as shown, the outer oblique walls of the hoppers 8, at their lower extremities, are provided with normally closed gates 13, which, when opened, afford access to the interior of the hoppers.

Adjacent to the cylindrical flange 7, the face plate 5 is provided circumferentially between the passages 7ª with quite large discharge ports 14. At its center, the face plate 5 has a bearing hub 15, in which is journaled a short vertical shaft 16 provided at its lower end with a bevel gear 17 that meshes with a bevel pinion 18 carried by a countershaft 19 journaled in suitable bearings 20 shown as secured to the bottom of the face plate and to the leg structure.

Figure 3:
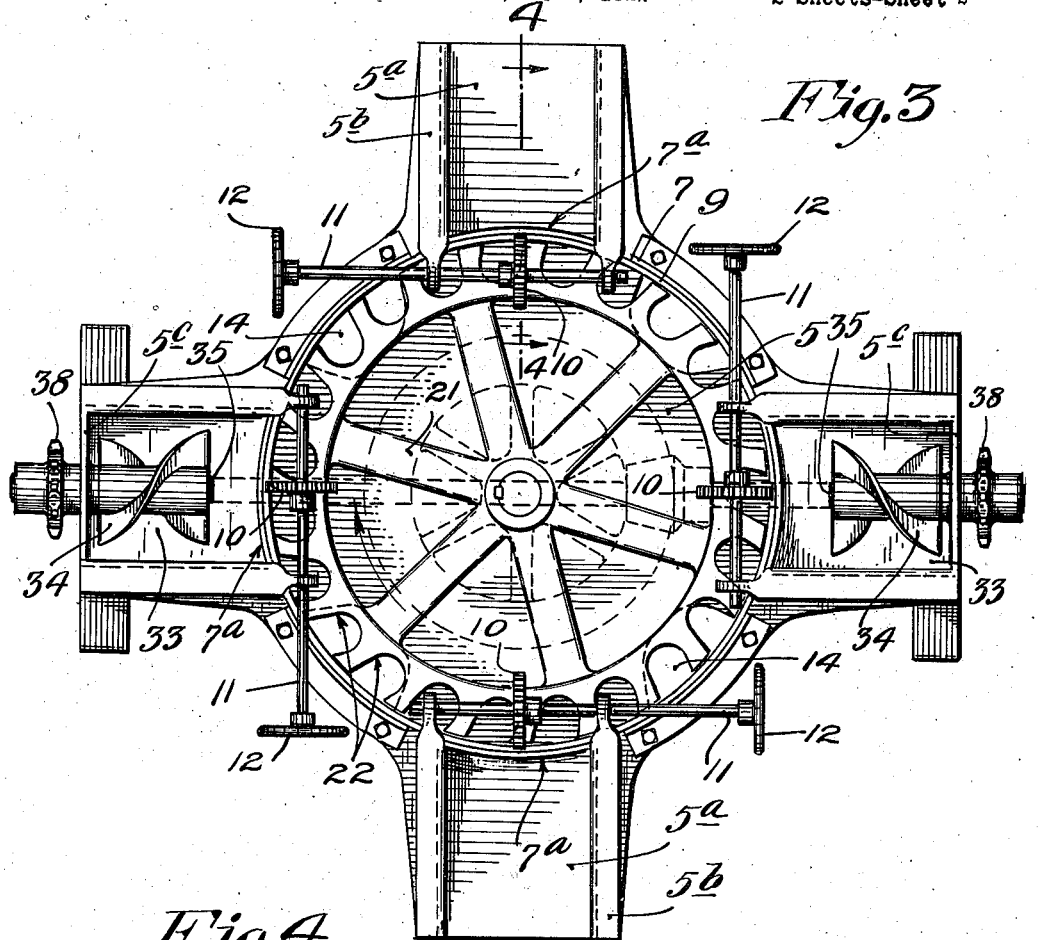
Fig. 3 is a plan view of the feeder with the several supply hoppers thereof removed.
Figure 4:
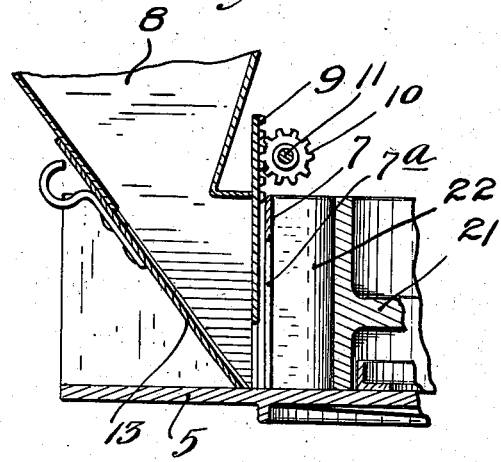
Fig. 4 is a vertical section on the line 4—4 of Fig. 3, some parts being broken away.

Secured to the upper end of the shaft 16 and arranged to rotate in a horizontal plane over the upper surface of the face plate 5 is a large feed wheel 21 that is formed with peripheral feed pockets or cups 22 that preferably incline backward slightly in respect to the direction of rotation of said wheel, the said direction of rotation being in the direction of the arrow marked on Fig. 3.

Supported by the leg structure 6, below and parallel to the shaft 19, is a mixing trough 23 open at one end for discharge. The numeral 25 indicates deflecting curtains attached to the upper edges of the trough 23 and normally attached at their upper edges to the bottom of the face plate 5. These curtains direct into the trough all of the several materials dropped through the feed ports 14, as will presently appear.

Working in the trough 23 is a spiral conveyer 26, the shaft 26ª of which is journaled in the closed end of the trough 23 and a fixed bearing 27 supported from the leg structure at the open end of the trough. At its extended end, the shaft 26ª is provided with a sprocket 28 and a pulley 29, over which latter runs a power-driven belt 30. A sprocket chain 31 runs over the sprocket 28 and over a sprocket 32 on one end of the shaft 19.

For delivering certain light materials, such as oat clippings, ground alfalfa and the like, agitators in the lower portions of the supply hoppers are necessary. These agitators may be applied in connection with all of the hoppers, if desired, but, as shown, they are applied only in connection with two hoppers, towit: diametrically opposite hoppers that overlie the shaft 19, and consequently in connection with these two last noted hoppers, the gates 13 are omitted and the flanges 5ᵇ, at their outer ends, are connected by a vertical web 5ᶜ that forms hopper chambers 33 in communication with the corresponding feed passages 7ᵃ. Working in these hopper chambers 33 are short spiral agitators 34 secured to the inner ends of short shafts 35 journaled in and extended through the webs 5ᶜ. These agitators 34 are driven through sprocket chains 36 that run over sprockets 37 and 38, respectively, on the outer ends of the shafts 19 and 35.

Here it may be noted that the spiral agitators 34 do not positively feed the material through the feed passages 7ᵃ but keep the material agitated and produce a light crowding pressure of the material toward said feed passages 7ᵃ and into the pockets 22 of the rotating feed wheel.

The depth to which the pockets 22 of the feed wheel 21 will be filled will depend on the vertical adjustments of the respective gates 9 and, hence, by adjustments of said gates, the machine can be set to feed the different materials in any desired proportions. The pockets 22, of course, receive the material from the particular hopper as they move past the feed passages 7ᵃ, and they will drop such material through the first discharge port 14, over which they sweep under rotation of the feed wheel. With the arrangement described, it is evident that each pocket 22 of the feed wheel, under a complete rotation of the feed wheel, will, in succession, be loaded with each of the several kinds of materials from the several hoppers and will successively drop each load through a feed port 14 on their way from one feed passage 7ᵃ to another. Thus, the feed wheel is made a very efficient carrying device which, at all times, co-operates with all of the hoppers and, of course, the number of hoppers may be varied, at will.

The efficiency of the device has been demonstrated in actual practice. It may be economically manufactured and set up as a complete self-contained structure at the factory and shipped as such, ready for use.

What I claim is:

1. In a feeder of the class described, the combination with a base plate having recesses in its outer periphery, a wheel journalled to said plate, means between said recesses delivering different material laterally to said plate, and means on said wheel for conducting the material to said recesses.

2. In a feeder of the class described, the combination with a base plate having recesses in its outer periphery, a wheel journalled to said plate, means between said recesses delivering different material laterally to said plate, and peripheral pockets in said wheel for conducting the material to said recesses.

3. In a feeder of the class described, the combination with a base plate having recesses in its outer periphery, a wheel centrally journalled to said plate, means between said recesses for delivering separately different material laterally to said plate, means for selectively regulating the supply to said plate, means in said wheel for conducting the material to said recesses, and means commingling the material as it issues from said recesses.

4. In a feeder of the class described, the combination with a base plate having recesses in its outer periphery, a wheel journaled to said plate, a plurality of supply hoppers positioned between said recesses adapted to deliver different material simultaneously and laterally to said feed plate, peripheral pockets in said wheel arranged upon rotation of the wheel to conduct the material to said recesses, and means commingling the material as it issues from said recesses.

5. In a feeder of the class described, the combination with a base plate having spaced apart upstanding peripheral flanges and horizontal openings adjacent said flanges, a wheel centrally journalled to said plate, hoppers positioned between said flanges for delivering different material to said plate, means connected to each of said hoppers independently regulating the supply to said plate, peripheral pockets in said wheel for conducting the material to said recesses upon rotation thereof, and means commingling the material as it issues from said recesses.

6. In a feeder of the class described, the combination with a base plate having spaced apart upstanding peripheral flanges and horizontal openings adjacent said flanges, a wheel centrally journaled to said plate, hoppers positioned between said flanges for delivering different material to said plate, independently adjustable gates in said hoppers for controlling the supply to said plate, peripheral pockets in said wheel conducting the material to said recess upon rotation thereof, and means in the bottom of said feeder for commingling the material as it issues from said recesses.

7. In a feeder of the class described, the combination with a base plate having spaced apart upstanding peripheral flanges and horizontal openings adjacent said flanges, a wheel centrally journaled to said plate, hoppers positioned between said flanges for delivering different material to said plate, agitators in certain of said hoppers forcing the material towards said plate, means in the periphery of said wheel conducting the material from said hoppers to said recesses, and means commingling the material as it issues from said recesses.

8. In a feeder of the class described, the combination with a base plate having spaced apart upstanding peripheral flanges and horizontal openings adjacent said flanges, a wheel centrally journaled to said plate, a drive shaft on said feeder in operative association with said wheel, hoppers positioned between said flanges for delivering different material to said plate, spiral agitators in certain of said hoppers, means for driving said agitators from said shaft, means in each of said hoppers for independently varying the supply to said plate, and means commingling the material as it issues from said recesses.

9. In a percentage feeder, the combination with a horizontal face plate having circumferentially spaced discharge ports and a cylindrical upstanding rim with feed passages circumferentially spaced between the discharge ports of said face plate, a vertical shaft journaled at the center of said face plate, a feed wheel secured to the upper end of said shaft and having peripheral pockets arranged to move over said face plate and the discharge portions thereof, a countershaft journaled below said face plate and geared to the lower end of said vertical shaft, a collecting trough below said face plate, a spiral conveyor in the latter, means for rotating said countershaft and spiral conveyor, and hoppers secured in respect to said face plate and arranged to deliver into the pockets of said feed wheel through the feed passages of said cylindrical rim.

10. The structure defined in claim 9 in which said hoppers adjacent to the feed passages of said cylindrical rim are provided with independently adjustable gates.

11. The structure defined in claim 9 in further combination with rotary spiral conveyors working in certain of said hoppers outward of the feed passages of said cylindrical rim, and means for driving said agitators from said countershaft.

12. The structure defined in claim 10 in further combination with rotary spiral conveyors working in certain of said hoppers outward of the feed passages of said cylindrical rim, and means for driving said agitators from said countershaft.

In testimony whereof I affix my signature.

ANGUS D. MacLELLAN.